Aug. 10, 1965  A. P. KELLEY ETAL  3,199,291
INTEGRATED AIRCRAFT ENGINES
Original Filed March 20, 1961
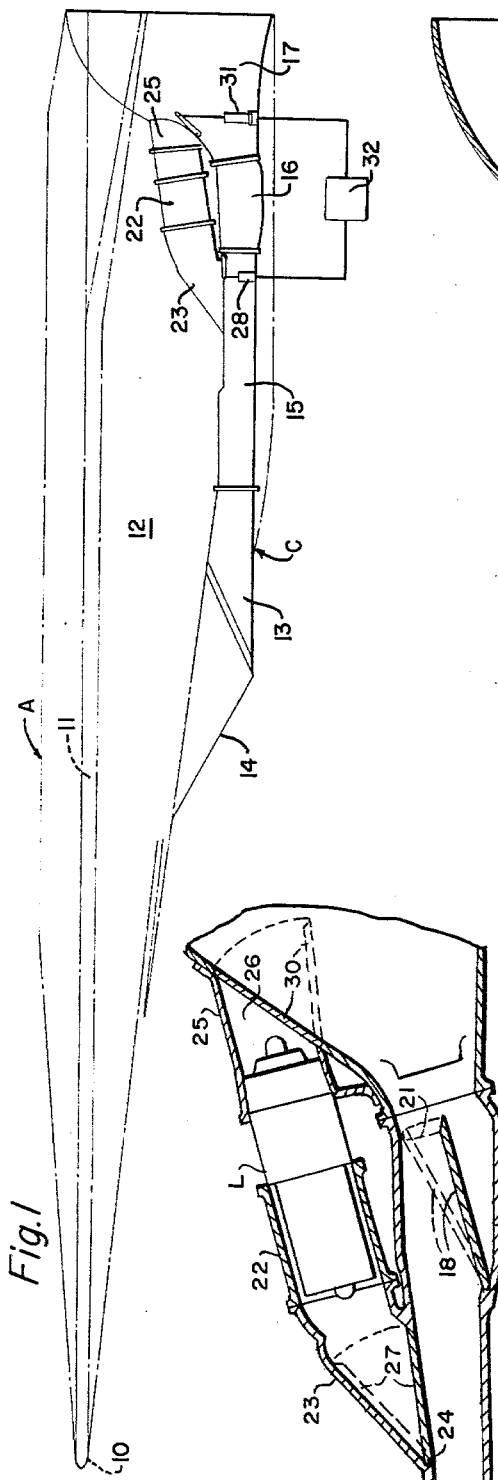
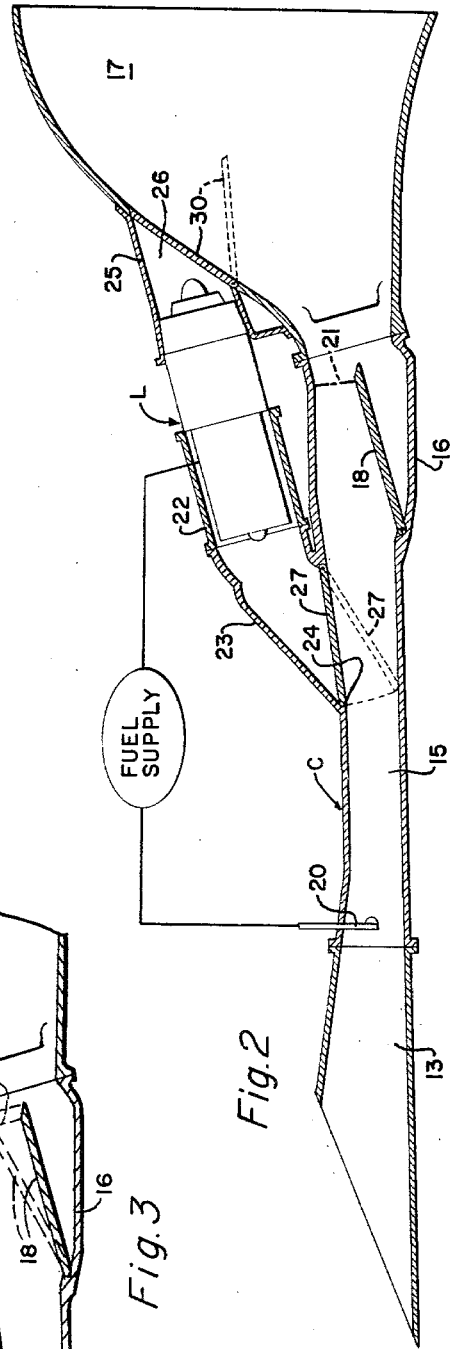
INVENTORS
ARCHIBALD P. KELLEY
CARL A. TAMARIN
BY
Francis H Weber
ATTORNEY

United States Patent Office 3,199,291
Patented Aug. 10, 1965

3,199,291
INTEGRATED AIRCRAFT ENGINES
Archibald P. Kelley and Carl A. Tamarin, Scottsdale, Ariz., assignors to The Garrett Corporation, Los Angeles, Calif., a corporation of California
Continuation of application Ser. No. 96,796, Mar. 20, 1961. This application Feb. 10, 1964, Ser. No. 344,524
3 Claims. (Cl. 60—35.6)

This application is a continuation of our application Serial No. 96,796, filed March 20, 1961, now abandoned, entitled Integrated Aircraft Engines.

This invention relates to hypersonic aircraft, and particularly to such an aircraft which is powered by different engines for different flight phases, and during the cruising phase is powered by a detonation combustion engine. The invention aims to provide an arrangement of the engines in such an aircraft which permits efficient coordination of the cruising engine with a suitable landing engine.

It has been suggested that a hypersonic aircraft which is designed to cruise at speeds above Mach 5.0, at altitudes of about 125,000 feet, may be accelerated to cruising speeds by some auxiliary means, such as a jettisonable booster. Cruising speeds may then be maintained with a detonation combustion engine, for example, which is only operable at speeds above Mach 1. When the flight is concluded, safe landing can best be accomplished by the use of another engine, such as a turbofan or turbojet engine, which is adaptable for proper maneuverability at suitable landing speeds. If the operation of the cruising engine is properly combined and integrated with that of the landing engine, there are certain aerodynamic and structural advantages, such as the reduction of aerodynamic drag by eliminating an additional inlet and exhaust for the landing engine, and reduction of weight by using common inlets and exhausts. Such integration results in an overall improvement in the operating efficiency of the aircraft. According to this invention, the desired integration and combination are best effected by positioning the landing engine adjacent the cruising engine so that a common intake and exhaust may be used for both engines. The location of the landing engine is also preferably between the cruising engine and the fuselage so that said landing engine is effectively insulated during cruising.

It is therefore an object of this invention to provide an integrated combination of a primary or cruising engine and a secondary or landing engine for use in a hypersonic aircraft.

Another object of the invention is to provide, in a hypersonic aircraft, a detonation combustion engine for cruising and a turbofan engine for landing said aircraft wherein both engines use the same type of fuel and have integrated intake and exhaust ducts.

Another object of the invention is to provide a primary detonation combustion engine, including an aerothermodynamic duct having an intake and an exhaust nozzle, a secondary turbofan engine associated therewith, and movable means in the duct for diverting fluid from said inlet into the secondary turbofan engine.

Still another object of the invention is to provide a primary detonation combustion engine, including an aerothermodynamic duct having an intake and an exhaust nozzle, a secondary turbofan engine associated therewith, movable means in the duct for diverting fluid from said inlet into the secondary turbofan engine, and means for directing the exhaust from said secondary turbofan engine into said exhaust nozzle.

A further object of this invention is to provide a hypersonic aircraft with a primary air flow path and a secondary airflow path branching therefrom, and having detonation combustion means in the first path for producing propulsive force for cruising speeds of the aircraft and a landing engine in said secondary airflow path.

It is another object of this invention to provide a hypersonic aircraft which is powered at cruising speeds by a detonation combustion engine, including a primary aerothermodynamic duct having an inlet, mixing section, combustor zone and exhaust nozzle, and a secondary duct extending between the combustor zone and the exhaust nozzle to provide a suitable airflow path for a landing engine.

The above and other objects and advantages of the invention will be apparent from the following description and the accompanying drawing, in which:

FIG. 1 is a schematic elevational view of a hypersonic aircraft powered by a combination of engines which are coordinated in accordance with this invention;

FIG. 2 is a vertical sectional view of the engines shown in FIG. 1; and

FIG. 3 is a fragmentary longitudinal sectional view of a slightly modified form of the invention.

As shown in the drawing, an aircraft A adapted for flight at hypersonic Mach numbers (above 5.0), for example, is indicated schematically by dot-and-dash lines as comprising an acute nose 10, an aerodynamic wing 11 having sharply swept leading edges, and a body or fuselage 12. The aircraft may be brought up to cruising speed by a starting phase engine, such as a jettisonable booster (not shown), and is then maintained at cruising speed by a cruising engine C which, in the form shown, operates on the principle of detonation combustion as described in the copending application of Hunter and Norman, Serial No. 88,149, filed February 9, 1961. Because such a detonation combustion engine operates at air speeds above Mach 5, it is necessary to have a third engine L to take care of the landing phase of the flight. In this instance, the landing engine L is mounted directly on and above the main cruising engine C for integration therewith and may be of any suitable type, such as a turbojet or turbofan. The location of the landing engine L between main engine C and the fuselage renders said landing engine effectively insulated from the hypersonic airstream outside the aircraft.

Cruising engine C is a detonation combustion engine depending for its operation on a series of shock waves which are created by the airframe and the design and shape of the engine itself, all as described in the coopending application of Hunter and Norman referred to above. The system of shock waves is such that a freestream of, for example, Mach 6.5, at the nose 10 of aircraft A is reduced to about 5.5 at the entrance or inlet section 13 of the engine. The inlet is normally closed, such as by a jettisonable cover 14, but when operation of engine C is started, the airstream, with proper control, proceeds from inlet 13 through a mixing section 15 and a combustor section 16 to an exhaust nozzle 17. Flow conditions through the combustor section are regulated by an adjustable ramp 18, so that, together with the shock waves developed by the internal shape of the engine duct, the fluid stream will have a velocity of 2.5 in the combustor section, with an attendant increase in static pressure and static temperature. Fuel may be injected into and mixed with the moving airstream in any suitable location in or immediately downstream of the inlet and in any desired manner, such as through injectors 20 shown in FIG. 2; and the increase in static temperature and pressure is such that detonation combustion takes place at the normal shock wave 21 indicated in dot-and-dash lines in FIG. 2.

From the foregoing description, it will be understood that the detonation combustion cruising engine C, in the form shown, comprises an elongated aerothermodynamic duct which, except for the exhaust, is rectangular in cross section. The aerothermodynamic duct is made up of the inlet section 13, mixing section 15, combustor section 16, and exhaust nozzle 17, and these individual sections of the duct, which may be secured together with suitable flanges, form a primary path for the main airstream. Landing engine L is mounted in a duct 22 which extends from the main duct at the downstream end of the mixing section 15 to the exhaust nozzle 17. This duct forms a secondary path branching from the primary path for the airstream and is used for operating the landing engine L during the landing phase of a flight.

As shown in FIG. 2, the duct 22 includes an angularly disposed inlet section 23 which extends from an opening 24 in the upper wall of the duct to the air intake of the turbofan engine L. The outlet or exhaust of the engine L is connected by suitable wall members or conduit 25 with the sloping outer surface of the exhaust nozzle 17, and an opening 26 is provided in the exhaust nozzle wall to permit the air and products of combustion to exhaust and create proper thrust conditions for the landing operation. In accordance with this invention, the inlet opening 24 is normally closed during operation of the detonation combustion engine by a flush hinged door 27 which may be actuated in any convenient manner, such as by a pneumatic plunger or piston actuator 28 (FIG. 1). Similarly, the exhaust outlet or opening 26 is normally closed by a hinged door 30 which conforms to the desired shape of the inner surface of the exhaust 17. This exhaust door 30 is adapted to be moved to an open position, as indicated in dashed lines in FIG. 2, by a second pneumatic actuator 31 (FIG. 1).

Both of the pneumatic actuators 28 and 31 may receive their actuating fluid from any convenient source, such as an auxiliary power unit (not shown). In addition, the actuators may be interconnected with a suitable control 32 so that they may be operated substantially simultaneously to open the doors 27 and 30 at the desired time. It will be noted, as shown in dashed lines in FIG. 2, that the door 27 is designed and arranged to open downwardly into the mixing section 15 of the engine C, so as to close off the downstream portion of the engine duct and bypass all of the inlet air into the engine L. Obviously, by adjustment, the hinged door could be arranged to bypass only a portion of the airstream and thus regulate the amount of air flowing to the engine L. It will also be apparent, as shown in FIG. 3, that the door 27 could be hinged at the upstream side thereof and arranged to open upwardly into the inlet section 23; and if this arrangement were desired, the hinged ramp 18 could be constructed to be moved upwardly, also as shown in FIG. 3, to a position to close off the cruising engine duct, so as to force the airstream into the inlet 23 for the landing engine.

Various other changes may be made in the construction and certain features may be employed without others, without departing from this invention or sacrificing any of its advantages.

We claim:
1. A cruising-landing engine system for a hypersonic aircraft, comprising:
 (a) a detonation combustion cruising engine including an aerothermodynamic duct having an air inlet at one end, an exhaust nozzle at the other end, a combustion zone intermediate said inlet and nozzle, a fuel injection nozzle in the duct upstream of said combustion zone, and a combustion control ramp in said combustion zone, said ramp being movable between open and closed positions;
 (b) landing engine means arranged in parallel with said combustion zone of said cruising engine including an air inlet duct branching off from said aerothermodynamic duct immediately upstream of said combustion zone between the zone and said fuel injection nozzle and having an air inlet passage communicating with said aerothermodynamic duct through a first wall opening therein, an exhaust duct branching off from said exhaust nozzle immediately downstream of said combustion zone between the zone and the rear open end of the exhaust nozzle and having an exhaust passage communicating to the interior of said exhaust nozzle through a second wall opening in said aerothermodynamic duct, and a jet thrust landing engine mounted between said inlet and exhaust ducts with its inlet in communication with the inlet passage in said inlet duct and its exhaust in communication with the exhaust passage in said exhaust duct;
 (c) means for selectively admitting the air flowing through said aerothermodynamic duct toward said combustion zone thereof into said inlet duct; and
 (d) means for selectively opening and closing said exhaust duct.

2. A cruising-landing engine system for a hypersonic aircraft, comprising:
 (a) a detonation combustion cruising engine including an aerothermodynamic duct having an air inlet at one end, an exhaust nozzle at the other end, a combustion zone intermediate said inlet and nozzle, a fuel injection nozzle in the duct upstream of said combustion zone, and a combustion control ramp in said combustion zone, said ramp being movable between open and closed positions;
 (b) landing engine means arranged in parallel with said combustion zone of said cruising engine including an air inlet duct branching off from said aerothermodynamic duct immediately upstream of said combustion zone between the zone and said fuel injection nozzle and having an air inlet passage communicating with said aerothermodynamic duct through a first wall opening therein, an exhaust duct branching off from said exhaust nozzle immediately downstream of said combustion zone between the zone and the rear open end of the exhaust nozzle and having an exhaust passage communicating to the interior of said exhaust nozzle through a second wall opening in said aerothermodynamic duct, and a jet thrust landing engine mounted between said inlet and exhaust ducts with its inlet in communication with the inlet passage in said inlet duct and its exhaust in communication with the exhaust passage in said exhaust duct;
 (c) a first door hinged along one edge to the edge of said first wall opening for swinging between a first position wherein said door is disposed in said first opening substantially flush with the surrounding wall of said aerothermodynamic duct and closes said first opening, and a second position wherein said door admits air from the aerothermodynamic duct to said inlet duct;
 (d) a second door hinged along one edge to an edge of said second wall opening for swinging between a first position wherein said second door is disposed in said second opening substantially flush with the immediately surrounding wall of said aerothermodynamic duct and closes said second opening, and a second position wherein said second door extends into said exhaust nozzle to open said second opening; and
 (e) means for selectively moving said doors to said positions thereof.

3. A cruising-landing engine system for hypersonic aircraft, comprising:
 (a) an aerothermodynamic duct having an inlet at one end, an exhaust nozzle at the other end, a combustion zone with a throat to retain a shock wave intermediate said inlet and exhaust nozzle, and a control ramp adjustably supported in said combustion zone to vary the area of the throat between said combustion zone and said exhaust nozzle;
 (b) a secondary duct adjacent the combustion section of said aerothermodynamic duct, said secondary duct containing a turbojet engine and having an inlet end connected for communication with said aerothermodynamic duct upstream of said combustion zone and an outlet end connected for communication with said exhaust nozzle; and (c) door means at the inlet and outlet ends of said secondary duct, said door means being movable between closed positions to prevent communication of said secondary duct with said aerothermodynamic duct and open positions to provide communication therebetween, said control ramp being movable to a position completely closing said throat and causing air flow through said secondary duct when said door means are in open positions.

References Cited by the Examiner
UNITED STATES PATENTS

| | | |
|---|---|---|
| 2,896,408 | 7/59 | O'Donnell. |
| 3,040,516 | 6/62 | Brees _____ 60—35.6 X |
| 3,093,348 | 6/63 | Schelp et al. |

SAMUEL LEVINE, *Primary Examiner*.